United States Patent [19]
Kopaska

[11] 3,964,246
[45] June 22, 1976

[54] ROTARY BALER

[75] Inventor: Arnold F. Kopaska, Guthrie Center, Iowa

[73] Assignee: Koehring Company, Milwaukee, Wis.

[22] Filed: Dec. 17, 1974

[21] Appl. No.: 533,647

[52] U.S. Cl. .................................. 56/341; 100/88
[51] Int. Cl.² ....................................... A01D 39/00
[58] Field of Search ..................... 56/341, 342, 343; 100/88

[56] References Cited
UNITED STATES PATENTS

| | | | |
|---|---|---|---|
| 456,484 | 7/1891 | Fisher | 100/88 |
| 2,581,542 | 1/1952 | Kolzing | 56/343 |
| 2,627,223 | 2/1953 | Berge | 100/88 X |
| 3,071,859 | 1/1963 | Rambo et al. | 100/88 X |
| 3,837,159 | 9/1974 | Vermeer | 56/341 |

*Primary Examiner*—J N. Eskovitz
*Attorney, Agent, or Firm*—Finnegan, Henderson, Farabow & Garrett

[57] ABSTRACT

A rotary baler for forming cylindrical bales is disclosed which automatically picks windrowed material from the ground and places it on a first conveyor belt which, together with a bale-starter roller mounted adjacent to the rear of the baler and a second conveyor belt above the first conveyor belt, form a cylindrical bale. The first belt is provided with slats to prevent the first belt from moving transversely to its direction of intended travel. At least one of the rollers about which the first conveyor belt is mounted is capable of translational movement toward and away from the front of the baler to permit downward deflection of the first conveyor belt by the bale.

25 Claims, 8 Drawing Figures

ROTARY BALER

BACKGROUND OF THE INVENTION

This invention relates to balers of windrowed material such as hay and, more particularly, to rotary balers for forming cylindrical bales.

For forming round bales of windrowed material, such as hay, it is desirable to be able to accomplish the entire baling operation automatically and, particularly, by one man. The automatic operation should include picking the material off the ground, baling it, wrapping the bale with twine and ejecting the bale from the baler. It is also preferred that the baler be easy to operate and stable so that it can be used on hills as well as flat plains.

It is the objective of this invention to provide an improved rotary baler for forming cylindrical bales safely, easily and automatically. This objective is realized with a rotary baler of this invention whereby the windrowed material is automatically picked from the ground and placed on a conveyor belt which, together with a balestarter roller and a second conveyor belt, form a cylindrical bale. Upon completion of the bale formation, the bale is automatically tied and ejected from the baler through a manually activated power system. The entire baling operation can be accomplished by one man seated on a baler-pulling tractor thereby making the baling procedure easy, efficient and safe.

Additional objectives and advantages of the invention will be set forth in part in the description which follows, and in part will be obvious from the description, or may be learned by practice of the invention. The objectives and advantages of the invention may be realized and attained by means of the instrumentalities and combinations particularly pointed out in the appended claims.

BRIEF DESCRIPTION OF THE INVENTION

To achieve the foregoing objectives and in accordance with the purpose of the invention, as embodied and broadly described herein, a rotary baler for forming a round bale of windrowed material comprises a chassis movable along the ground and having spaced apart first and second side walls, a first roller mounted on the chassis adjacent to the front and bottom thereof for rotation about a substantially horizontal transverse axis, a second roller mounted on the chassis adjacent to the rear and bottom thereof for rotation about a substantially horizontal transverse axis, a first conveyor belt extending transversely substantially between the first and second side walls and drivingly mounted on the first and second rollers forming a first upper run extending between and on the top of the first and second rollers and a first lower run between and below the first and second rollers, means for driving the first conveyor belt such that the first upper run moves in a direction from the front toward the rear of the baler, a third roller mounted on the chassis adjacent to the front thereof and spaced upwardly from the first roller, the third roller being mounted for rotation about a substantially horizontal, transverse axis, a fourth roller mounted on the chassis adjacent to the rear thereof and spaced upwardly from the second roller, the fourth roller being mounted for rotation about a substantially horizontal, transverse axis, a second conveyor belt extending transversely substantially between the first and second side walls and drivingly mounted on the third and fourth rollers forming a second upper run extending between and above the third and fourth rollers and a second lower run between the lower surfaces of the third and fourth rollers, means for driving the second conveyor belt such that the second lower run moves in a direction from the rear toward the front of the baler, a bale-starter roller mounted on the chassis adjacent to the rear thereof and positioned vertically between the second lower run and the first upper run, means for rotating the bale-starter roller in the same direction as the second fourth rollers, and means to relocate the fourth roller and bale-starter roller in order to enable the bale formed by the baler to be removed from the baler, whereby windrowed material delivered to the first conveyor belt is transported to the rear of the baler where it is caused to reverse its direction of travel by the bale-starter roller to form the core of a round bale.

Preferably, at least the first or second roller is mounted to permit translational movement thereof toward and away from the front of the baler in order to permit downward deflection of the first conveyor belt by the bale being formed in the baler, the extent of deflection of the first conveyor belt being proportional to the weight of the bale. Means are also provided to maintain the first and second roller parallel to each other during translational movement of the first or second roller.

It is also preferred that the first conveyor belt includes a plurality of transversely extending slats on the exterior surface thereof, the slats projecting transversely beyond the sides of the first conveyor belt into closed proximity to the baler side walls in order to prevent transverse shifting movement of the first conveyor belt relative to the first and second rollers.

It is also preferred that a support member, pivotally mounted on the chassis, is in forceable contact with the second conveyor belt and that means are provided for controlling the force applied by the support member on the second conveyor belt.

The invention consists in the novel parts, constructions, arrangements, combinations and improvements shown and described. The accompanying drawings, which are incorporated in and constitute a part of this specification, illustrate one embodiment of the invention and, together with the description, serve to explain the principles of the invention.

BRIEF DESCRIPTION OF THE DRAWINGS of the drawings.

DETAILED DESCRIPTION OF THE INVENTION

Reference will now be made in detail to the present preferred embodiment of the invention, an example of which is illustrated in the accompanying drawings.

In accordance with the invention, the rotary baler of this invention includes a chassis, a hitch for attaching the chassis to a vehicle, such as a tractor, and means for forming a cylindrical bale of windrowed material such as hay.

As here embodied, a rotary baler 10 is formed with a chassis 12 mounted on and supported above the ground by a pair of spaced apart wheels 14. The chassis includes transversely spaced apart sides 16, 18 each of which is formed of a rigid peripheral frame 20 and a side wall 22 fixedly attached to the peripheral frame 20, such as by bolting or welding. The sides 16, 18 are connected together by several transverse structural members or beams 23 attached to the frame 20. The beams 23 are located so as to not interfere with the movement of windrowed material into the baler and out of the baler.

A hitch 24 is attached for pivotal movement of the chassis 12 and is adapted to be removably attached by any conventional means, such as a bolt and cotter pin 26, to a driving vehicle, for example, a tractor (not shown). For reference purposes, the portion of the baler 10 adjacent to the hitch 24 is referred to throughout this description as the front of the baler.

In accordance with this invention, a first conveyor belt 30 is mounted between the sides 16, 18 and adjacent to the bottom of the baler 10. The belt 30, referred to herein as the lower belt, is drivingly supported by a pair of spaced apart rollers 32, 34 rotatably mounted adjacent to the front and rear, respectively, of the baler for rotation about substantially horizontal transverse axes. The front roller 32 is held in position on the side walls 16, 18 by shaft supports and bearings of conventional design. By driving means described hereinafter, the front roller 32, is driven to rotate in a direction so as to cause the upper run 35 of the lower conveyor belt 30 to travel from front to rear of the rotary baler 10.

Preferably, the second, or rear, roller 34, is mounted on the side walls 16, 18 so as to permit translational movement of the roller 34 toward and away from the front roller 32. This can be accomplished by mounting the rear roller 34 in an enlarged slot or way 36 and by spring loading the rear roller 34 to permit maintaining constant tension in the lower belt 30 while permitting the lower belt to be depressed during formation of the bale as is described in detail below. It is also desirable to ensure that the rear roller 34 remains horizontal and parallel to the front roller 32. Any substantial deviation would cause the bale being formed to be unsymmetrical and overload one side of the baler 10.

Figure 2:
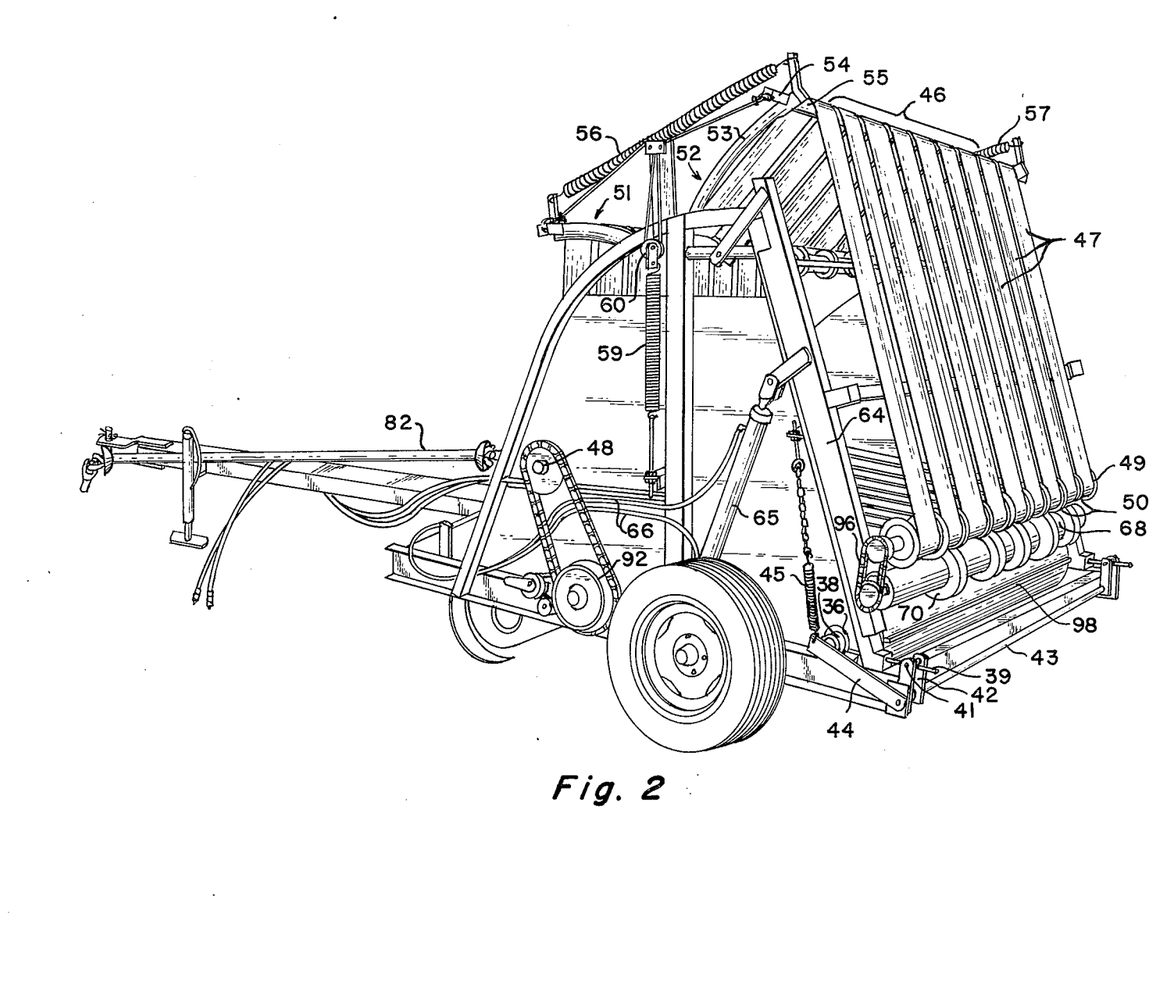
FIG. 2 is a perspective rear view of the baler of FIG. 1.
Figures 3, 4:
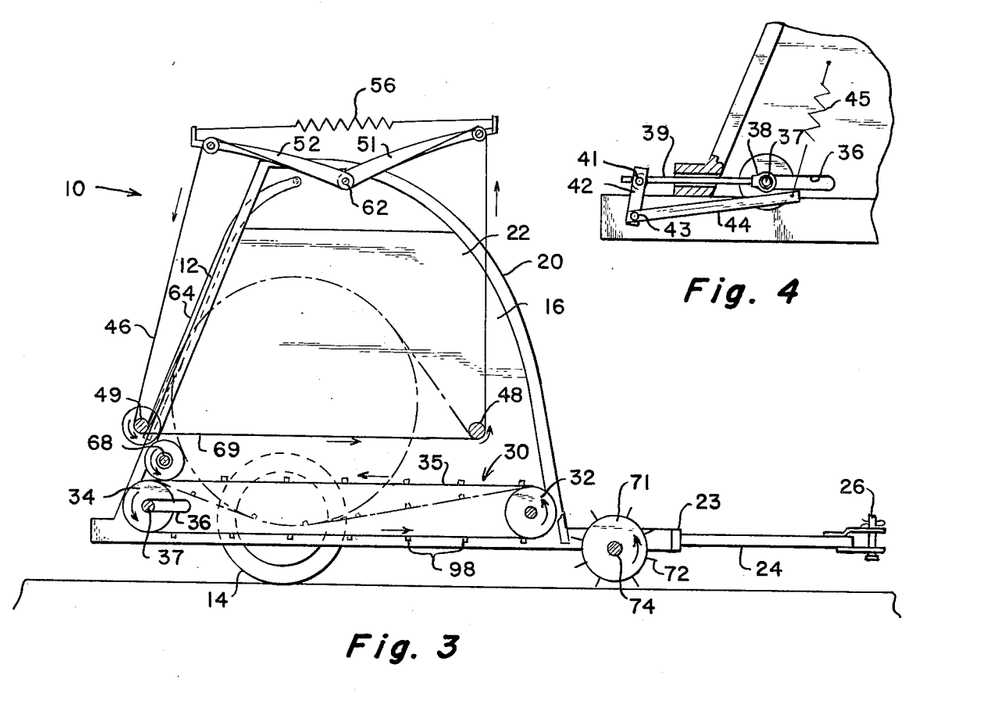
FIG. 3 is a schematic elevational view of the baler of FIG. 1 taken between the side walls of the baler.
FIG. 4 is a schematic view of the rear-bottom roller mounting means which maintains this roller parallel with the front-bottom roller.

As embodied herein, and with reference to FIGS. 2 and 4, in order to ensure parallel translational movement of the rear roller 34, the rear roller shaft 37 is supported on each end in a bearing 38, the outer race or housing of which is rigidly attached to one end of a rod 39. The other end of the rod 39 is attached to a pin 41 pivotally supported at the upper end of a yoke support 42. A torque shaft 43 is rigidly attached to and interconnects the bottom of the yoke support 42 so that both ends of the rear roller shaft 37 move simultaneously.

Translational movement of the roller shaft 37 is restrained by a torque arm 44 mounted on one or both sides of the baler 10 and which is attached at one end to the torque shaft 43. The other end of the torque arm is connected to a biasing means, such as a coil spring 45 attached to the chassis 12.

Figure 1:
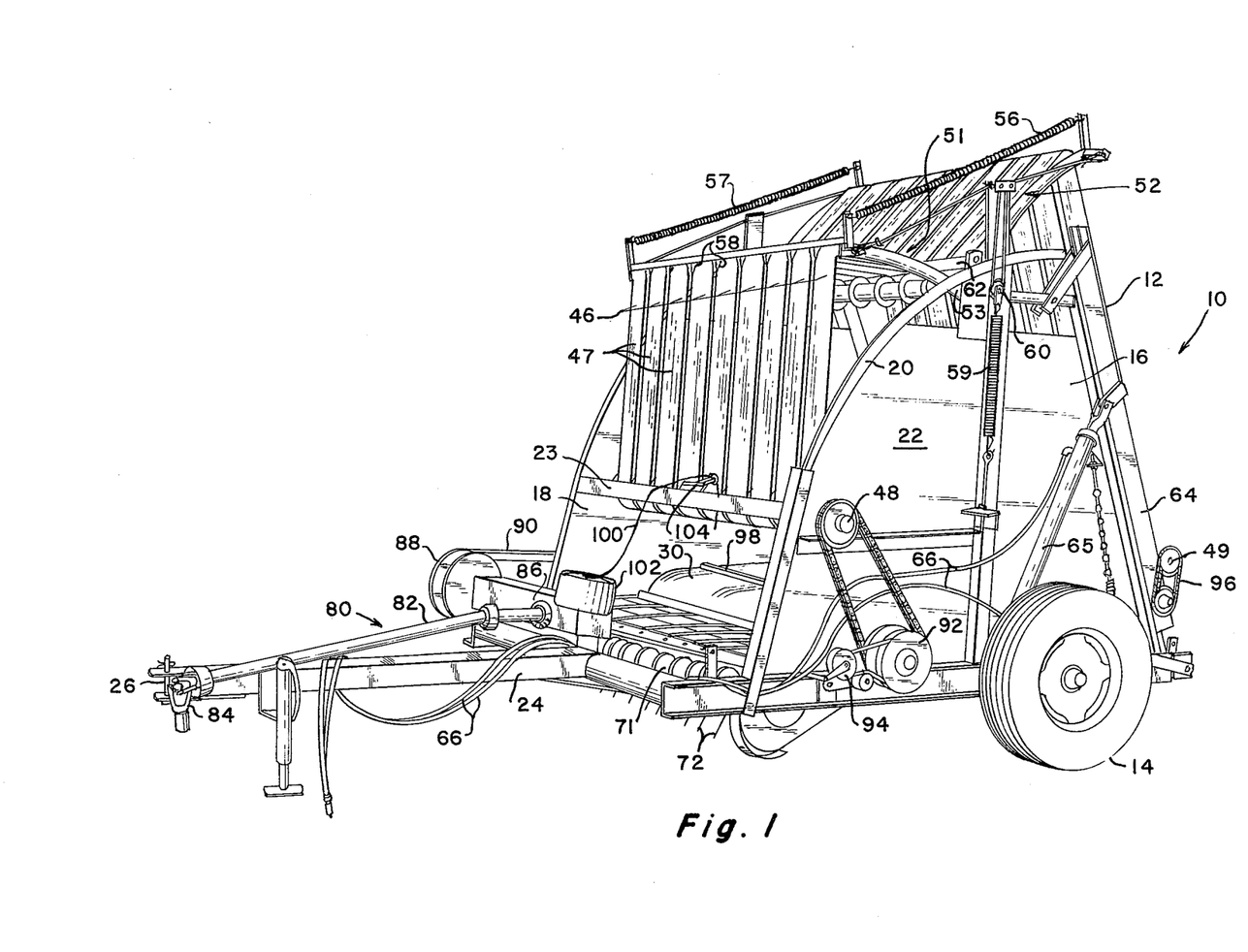
FIG. 1 is a perspective front view of a baler formed in accordance with this invention.

Further in accordance with this invention, a second or upper conveyor belt 46 is mounted above the lower conveyor belt 30 and extends transversely between the sides 16, 18. The upper conveyor belt 46 preferably is formed of a composite of a plurality of narrow transversely aligned and spaced apart belts 47 as can be seen in FIG. 1. An economic advantage is provided by using a plurality of belts since the individual, smaller belts are easier to replace and damage to one or a few belts 47 will not necessitate replacing all of the belts. In contrast, damage to a portion of a single wide belt would require replacing the entire belt.

The upper conveyor belts 47 are drivingly supported by a pair of horizontal rollers 48, 49 mounted adjacent the front and rear of the baler 10 respectively. The individual belts 47 are maintained in place on the rollers 48, 49 by belt guides 50 appropriately spaced apart along the length of the rollers.

The upper belts 47 are further supported by a pair of tension members 51, 52 having a generally U-shaped configuration formed of generally parallel spaced apart arms 53, and a cross bar 54 over which a freely rotating journaled sleeve 55 is placed. Belt guides 58 may also be on or in conjunction with the tension members 51, 52. The ends of the arms 53 distal from the cross bar 54 are pivotally attached to the sides of the chassis 12. Each of the tension members 51, 52 are independently movable and are spring biased toward an upward portion by suitable biasing means, such as tension coil springs 56, 57 extending between the tension members 51, 52 on opposite sides of the baler 10. Additional coil springs 59 may be used to bias the tension members, each spring being attached at one end of the chassis 12 and at the other end to the cross bar 54 of the tension members 51, 52 by a pulley and wire 60. Support and tensioning of the upper conveyor belts 47 are completed by one or more sets of idler rollers, such as that shown at 62.

In accordance with the embodiment shown, the front roller 48 for the upper belts 47 is rotatably attached to the side walls 16, 18 of the baler 10; however, the rear roller 49 is rotatably mounted on a support arm 64 which is pivotally attached to the side walls 16, 18 near the top of the baler 10. The support arm 64 is movable upwardly by any conventional means, such as a hydraulic cylinder 65 which is adapted to be connected by hydraulic lines 66 to the hydraulic system conventionally provided on tractors. Of course, other motor means can be used for moving the support arm 64, for example a pneumatic system or an electric motor.

In accordance with this invention, a bale-starting roller 68 is rotatably mounted on the support arm 64 below the upper conveyor belt rear roller 49. The bale-starting roller 68 extends across the width of hte baler 10 between the side walls 16, 18 and, preferably, is located on the forward side of the rear belt rollers 34, 49. The bale-starting roller 68 is positioned vertically between the lower run 69 of the upper conveyor belt 46 and the upper run 35 of the lower conveyor belt 30. As can be seen in FIG. 3, the upper run 35 of the lower conveyor belt 30 is spaced from and moves in the opposite direction from the lower run 69 of the upper conveyor belt 46. The bale-starting roller 68 is driven for rotation in the same direction as the rear rollers 49 and 34 between which it is mounted. In order to improve the bale-forming efficiency of the starting roller 68, the roller is provided with a high friction or rough surface. For example, rubber tubes 70 may be mounted at various positions along the length of the bale-starter roller 68. Coating or covering the starter roller 68 with a friction material such as rubber would also help, as would providing grooves on the starter roller covering.

Figure 8:
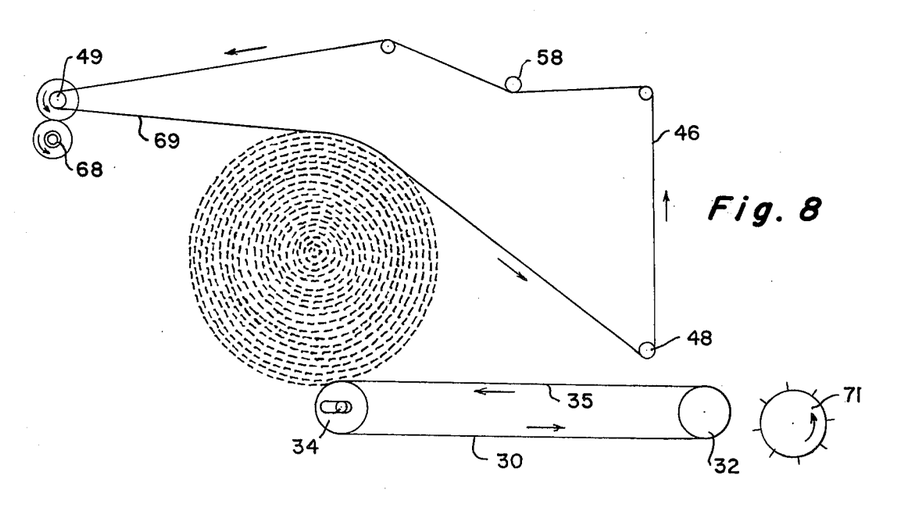

Because the upper rear roller 49 and the bale-starting roller 68 are both located on the pivotal support arm 64, movement of the suppport arm 64 upwardly by activation of the hydraulic system effects relocation of the rear roller 49 and the bale-starting roller 68 to permit removal of a bale of windrowed material formed in the baler 10 (see FIG 8).

In order to lift the windrowed material to be baled from the ground, a pick-up reel 71 is rotatably mounted at the front of the baler 10. The pick-up reel 71, which is of conventional design and may be vertically adjustable, is coextensive with the width of the baler 10 and includes a plurality of spikes 72. The pick-up reel 71 is powered to rotate in such a direction as to deliver the windrowed material which is picked up from the ground to the upper run 35 of the lower conveyor belt 30.

In order to power the various rollers of the baler 10, a power transmission system 80 is provided to transmit power from the driving vehicle, such as a tractor, to the baler 10. The power transmission system 80 includes a rotatable shaft 82 having a universal joint and a conventional telescoping connection 84 at its front end adapted to be received by a standard manually controlled standard power takeoff unit (not shown). The transmission shaft 82 rotates the input shaft of a right angle gear box assembly 86. An output pinion shaft, driven by the input shaft, rotates a primary pulley 88.

The primary pulley 88 drives the lower front roller 32 by means of a V-belt 90 and, through a sprocket and chain drive 92, the lower front roller drives the upper front roller 48. The lower front roller 32 also drives the pick-up reel 71 through a V-belt and pulley drive 94. Rotation of the lower and upper front rollers 32, 48 drives the lower conveyor belt 30 and the upper conveyor belts 47. The rear rollers 34, 49 for the lower and upper conveyor belts 30, 47 respectively are rotated by the conveyor belts 30 and 47 while the bale-starting roller 68 is driven from the rear upper roller 47 by a chain and sprocket drive 96.

In order to bale windrowed material, the operator turns on the tractor power takeoff unit thereby effecting rotation of the power shaft 82 which, in turn, drives the pick-up reel 71, the lower and upper belts 30, 47 respectively and the bale-starting roller 68.

Figures 5, 6, 7:
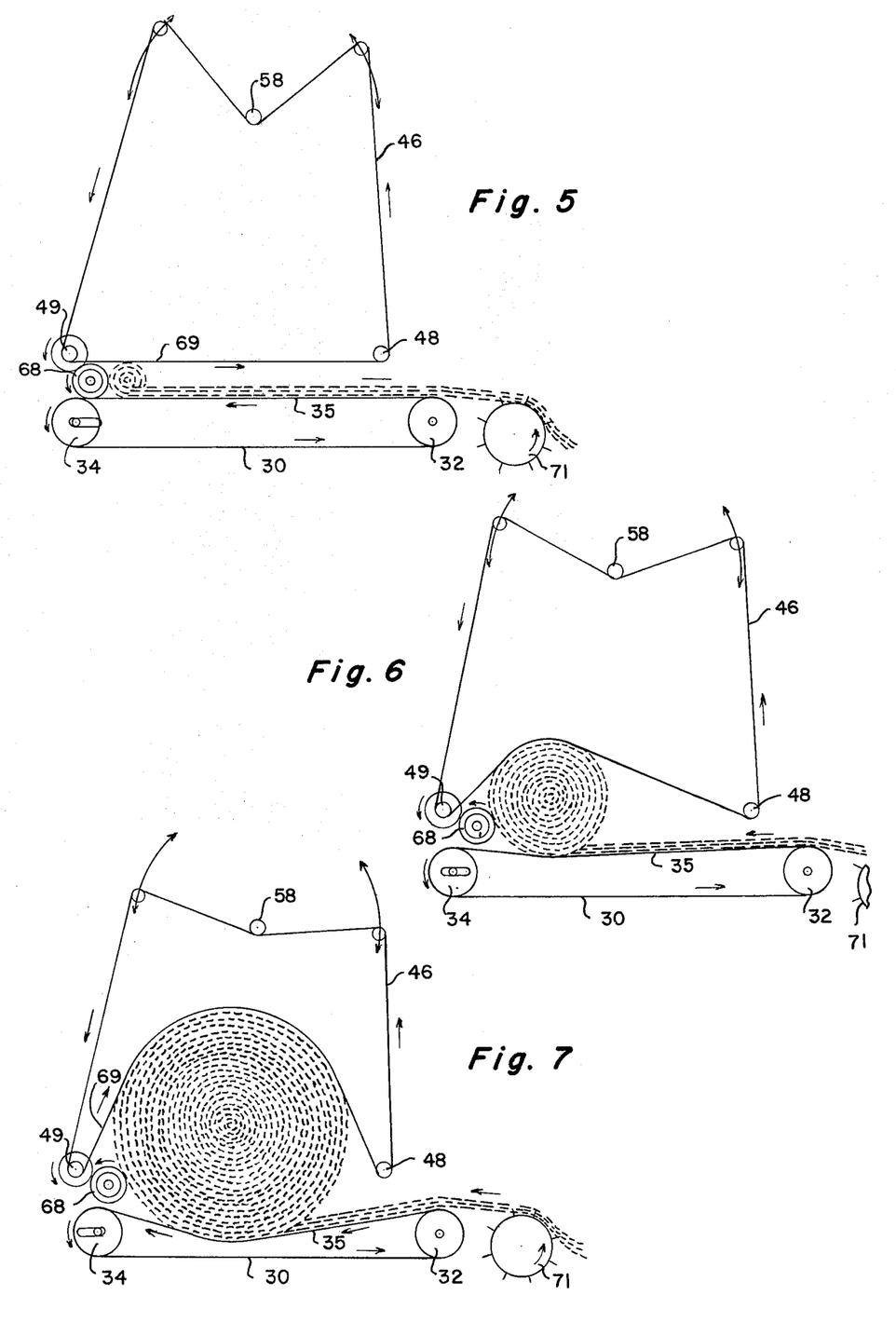
FIGS. 5–8 are schematic illustrations showing the baler in various bale forming stages.

As the baler 10 is pulled forwardly by a tractor, the pick-up reel 71 lifts the windrowed material from the ground and throws it onto the upper run 35 of the lower conveyor belt 30. The lower conveyor belt 30 conveys the material rearwardly until it comes into contact with the bale-starting roller 68. The effect of the bale-starting roller is to cause the windrowed material to reverse its direction of travel and rise slightly. As the material falls toward the lower belt 30 it again moves rearwardly, forms a cylindrical core and rotates the core, as shown in FIG. 5. As more windrowed material is conveyed to the rear of the baler 10, the bale of windrowed material increases in diameter and soon comes in contact with the lower run 69 of the upper conveyor belts 47 (FIGS. 6 and 7).

It has also been found advantageous to mount a plurality of spaced apart transverse slats 98 on the outer surface of the lower belt 30. The slats 98 project transversely beyond the sides of the lower belt 30 and have minimal clearance with the baler sides 16, 18. The slats 98 prevent transverse shifting of the lower belt 30 relative to the lower rollers 32, 34 since any slight shift causes the slats to engage the baler sides 16, 18 and prevent further shifting.

Upon completion of formation of a desired bale size, the tractor is stopped and the bale is wrapped and bound with a binding twine 100 stored on a reel 102 at the front of the baler 10. This is accomplished by running the power take-off unit so that the bale is rotating and feeding the twine into the baler with the last portion of unbaled material. A twine tube 104 is pivotally mounted at the front of the baler and, through manual or automatic reel control, moves the twine axially along the length of the bale. After wrapping with the twine, the baler is turned off and the twine is cut.

In order to remove the bale from the baler, the hydraulic cylinder 65 is activated which raises the support arms 64 effecting removal of the rollers 40 and 68 from behind the bale (see FIG. 8). The power take-off unit is turned on and the bale is ejected from the bale 10 by the lower conveyor belt 30 which causes the bale to move rearwardly until it falls from the rear of the baler 10.

It can be seen that the baler 10 of this invention permits baling of windrowed material by a single person relatively easily while sitting on a tractor. In addition to being efficient, the baler is also safe since the operator is removed from the baler its entire operation. The baler 10 also has a low center of gravity during use to provide improved stability for use on hilly terrain.

What is claimed is:

1. A rotary baler for forming a round bale of windrowed material comprising:
   a. a chassis movable along the ground and having spaced apart first and second side walls,
   b. a first roller mounted on said chassis adjacent to the front and bottom thereof for rotation about a substantially horizontal transverse axis,
   c. a second roller mounted on said chassis adjacent to the rear and bottom thereof for rotation about a substantially horizontal transverse axis,
   d. a first conveyor belt extending transversely substantially between said first and second side walls aand drivingly mounted on said first and second rollers forming a first upper run extending between and on the top of said first and second rollers and a first lower run between and below said first and second rollers,
   e. means for driving said first conveyor belt such that said first upper run moves in a direction from the front toward the rear of the baler,
   f. a third roller mounted on said chassis adjacent to the front thereof and spaced upwardly from said first roller, and third roller being mounted for rotation about a substantially horizontal, transverse axis,
   g. a fourth roller mounted on said chassis adjacent to the rear thereof and spaced upwardly from said second roller, said fourth roller being mounted for rotation about a substantially horizontal, transverse axis,
   h. a second conveyor belt extending transversely substantially between said first and second side walls and drivingly mounted on said third and fourth roller forming a second upper run extending between and above said third and fourth rollers and a second lower run between the lower surfaces of said third and fourth rollers, i. means for driving said second conveyor belt such that said second lower run moves in a direction from the rear toward the front of the baler, j. a bale-starter rolled mounted on said chassis adjacent to the rear thereof and positioned vertically between the second lower run and the first upper run, k. means for rotating said bale-starter roller in the same direction as said second and fourth rollers, l. pick-up means at the front of said chassis for picking up the windrowed material from the ground and delivering it to the first upper run, and m. means to relocate said fourth roller and bale-started roller in order to enable the bale to be removed from the baler, whereby windrowed material delivered to the first conveyor belt is transported to the rear of the baler where it is caused to reverse its direction of travel by the bale-starter roller to form the core of a round bale.

2. A rotary baler as defined in claim 1 including a support arm on which said fourth roller and said bale-starter roller are rotatably mounted, said support arm being pivotally mounted on the chassis to permit raising said fourth roller and bale-starter roller above the intended height of a bale to be formed by said baler and including means for raising said support arm.

3. A rotary baler as defined in claim 2 wherein said bale-starter roller is drivingly connected to said fourth roller.

4. A rotary baler as defined in claim 1 including a hitch attached to the front of said chassis adapted for attaching the baler to a vehicle.

5. A rotary baler as defined in claim 1 including a support member mounted on the chassis and in forceable contact with the second conveyor belt and means for controlling the force applied by said support member on said second conveyor belt.

6. A rotary baler as defined in claim 5 wherein said fourth roller and said bale-starter roller are rotatably mounted on a support arm, said support arm being pivotally mounted on the chassis to enable selective raising of said fourth roller and bale-starter rollers above the intended height of a bale to be formed by said baler.

7. A rotary baler as defined in claim 5 wherein said support member enables increasing the length of said second lower run by upward deflection in order to accomodate the increasing diameter of a bale being formed by the baler.

8. A rotary baler as defined in claim 7 wherein said second conveyor belt comprises a plurality of transversely aligned belts.

9. A rotary baler for forming a round bale of windrowed material comprising:

a. a chassis movable along the ground and having spaced apart first and second side walls, b. a hitch attached to the front of said chassis adapted for attaching the baler to a vehicle, c. a first roller mounted on said chassis adjacent to the front and bottom thereof for rotation about a substantially horizontal transverse axis, d. a second roller mounted on said chassis adjacent to the rear and bottom thereof for rotation about a substantially horizontal transverse axis, e. a first conveyor belt extending transversely substantially between said first and second side walls and drivingly mounted on said first and second rollers forming a first upper run extending between and on the top of said first and second rollers and a first lower run between and below said first and second rollers, f. means for driving said first conveyor belt such that said first upper run moves in a direction from the front toward the rear of the baler, g. a third roller mounted on said chassis adjacent to the front thereof and spaced upwardly from said first roller, said third roller being mounted for rotation about a substantially horizontal, transverse axis, h. a fourth roller mounted on a support arm, said support arm being pivotally mounted on said chassis, said fourth roller being positioned adjacent to the rear of the chassis and spaced upwardly from said second roller, said fourth roller being mounted for rotation about a substantially horizontal, transverse axis, i. a second conveyor belt extending transversely substantially between said first and second side walls and drivingly mounted on said third and fourth roller forming a second upper run extending between and above said third and fourth rollers and a second lower run between the lower surfaces of said third and fourth rollers, j. a support member pivotally mounted on the chassis above the third and fourth rollers and in forceable contact with the second conveyor belt, said support member enabling increasing the length of said second lower run by upward deflection to accommodate the increasing diameter of a bale formed by the baler, k. means for controlling the force applied by said support member on said second conveyor belt, l. a bale-starter roller mounted on said support arm below said fourth roller and above said first upper run, said bale-starter roller and said fourth roller being drivingly interconnected such that said bale-starter and fourth rollers rotate in the same direction, m. selectively operable means to raise said support in order to raise said bale-starter and fourth rollers above the intended height of a bale to be formed by said baler to enable the bale to be removed from the baler, and n. means for driving said second conveyor belt such that said second lower run moves in a direction from the rear toward the front of the baler.

10. A rotary baler as defined in claim 1 wherein at least one of said first and second rollers is mounted to permit translational movement thereof toward and away from the front of said baler in order to permit downward deflection of said first conveyor belt by the bale being formed in said baler, the extent of deflection of said first conveyor belt being proportional to the weight of the bale.

11. A rotary baler as defined in claim 1 wherein the first conveyor belt includes a plurality of parallel transversely extending slats on the exterior surface thereof, said slats projecting transversely beyond the sides of said first conveyor belt into close proximity to said first and second sides in order to prevent transverse shifting movement of said first conveyor belt relative to said first and second rollers.

12. A rotary baler for forming a round bale of windrowed material comprising:

a. a chassis movable along the ground and having spaced apart first and second side walls;
b. a hitch attached to the front of said chassis adapted for attaching the baler to a vehicle;
c. a first roller mounted on said chassis adjacent to the front and bottom thereof for rotation about a substantially horizontal transverse axis;
d. a second roller mounted on said chassis adjacent to the rear and bottom thereof for rotation about a substantially horizontal transverse axis;
e. a first conveyor belt extending transversely substantially between said first and second side walls and drivingly mounted on said first and second rollers forming a first upper run extending between and on the top of said first and second rollers and a first lower run between and below said first and second rollers, said runs being supported only by said rollers;
f. means for driving said first conveyor belt such that said first upper run moves in a direction from the front toward the rear of the baler;
g. roller mounting means for mounting one of said first and second rollers to permit translational movement thereof toward and away from the front of said baler in order to permit downward deflection of said first upper run by the bale being formed in said baler, the extent of deflection being proportioned to the weight of the bale;
h. a third roller mounted on said chassis adjacent to the front thereof and spaced upwardly from said first roller, said third roller being mounted for rotation about a substantially horizontal, transverse axis;
i. a fourth roller mounted on said chassis adjacent to the rear thereof and spaced upwardly from said second roller, said fourth roller being mounted for rotation about a substantially horizontal, transverse axis, the axes of said third and fourth rollers being fixed during formation of the bale;
j. a second conveyor belt extending transversely substantially between said first and second side walls and drivingly mounted on said third and fourth roller forming a second upper run extending between and above said third and fourth rollers and a second lower run between the lower surfaces of said third and fourth rollers, said second lower run being spaced apart from and, prior to formation of said bale, substantially parallel to said first upper run;
k. means for driving said second conveyor belt such that said second lower run moves in a direction from the rear toward the front of the baler;
l. means for extending the length of said second lower run to enable said second lower run to be deflected vertically upwardly;
m. means mounted on said chassis for starting the formation of a round bale;
n. pick-up means at the front of said chassis for picking up the windrowed material from the ground and delivering it to the first upper run.

13. A rotary baler as defined in claim 12 wherein said roller mounting means is sring biased toward a first position wherein the first upper run is substantially planar and including means for maintaining the axis of said one of said first and second rollers parallel to the axis of the other of said first and second rollers.

14. A rotary baler as defined in claim 12 including guide means attached to both ends of said one of said first and second rollers, and control means for effecting substantially simultaneous and parallel movement of said guide means to maintain the axes of said first and second rollers parallel.

15. A rotary baler as defined in claim 14 wherein said control means includes a torque shaft, first and second pivotally mounted members attached to opposite ends of said torque shaft and attached to said guide means, a torque arm attached to said torque shaft and means to bias said torque arm in one direction whereby a downward force applied to said first upper run causes said guide means to move toward the middle of said baler pivoting said first and second pivotally mounted member and rotating said torque shaft and torque arm against the force of the biasing means.

16. A rotary baler as defined in claim 12 wherein said one of said first and second rollers is said second roller, said roller mounting means is spring biased toward a first position when the first upper run is substantially planar and including means for maintaining the axis of said second roller parallel to the axis of said first roller as said second roller moves toward and away from the front of said baler.

17. A rotary baler as defined in claim 16 wherein said means for starting the formation of a round bale includes a bale-starter roller adjacent to the rear of said baler and positioned vertically between the second lower run and the first upper run and means for rotating said bale-starter in the same direction as said second and fourth rollers.

18. A rotary baler as defined in claim 17 including a power transmission system positively driving said first and third rollers, and wherein said second roller is rotated by said first conveyor belt and first roller, said fourth roller is rotated by said second conveyor belt and said third roller, and said bale-starter roller is drivingly connected to said fourth roller.

19. A rotary baler as defined in claim 18 wherein said power transmission system includes means adapted to be attached to and driven by a power system on said vehicle and wherein said pick-up means is drivingly connected to one of said first and third rollers.

20. A rotary baler as defined in claim 17 wherein said fourth roller and said bale-starter roller are rotatably mounted on a support arm, said support arm being pivotally mounted on the chassis, and including means for lifting said support arm sufficiently to raise fourth roller and ball-starter roller above the intended height of a bale to be formed by said baler.

21. A rotary baler as defined in claim 20 wherein said means for extending the length of said second lower run comprises a support member pivotally mounted on the chassis above the third and fourth rollers and in forceable contact with the second conveyor belt and means for controlling the force applied by said support member enabling increasing the length of said second lower run by upward deflection in order to accomodate the increasing diameter of a bale formed by the baler.

22. A rotary baler for forming a round bale of windrowed material comprising:
a. a chassis movable along the ground having spaced first and second side walls,
b. a first roller mounted on said chassis adjacent to the front and bottom thereof for rotation about a substantially horizontal trasverse axis,
c. a second roller mounted on said chassis adjacent rear and bottom thereof for rotation about a substantially horizontal transverse axis, d. a first conveyor belt extending transversely substantially between said first and second side walls and drivingly mounted on said first and second rollers forming a first upper run extending between and on the top of said first and second rollers and a first lower run between and below said first and second rollers, said first conveyor belt having a plurality of parallel transversely extending slats attached to the exterior surface thereof, each of said slats projecting transversely beyond the sides of said first conveyor belt into close proximity to said first and second side walls in order to prevent transverse shifting movement of said first conveyor belt relative to said first and second rollers, e. means for driving said first conveyor belt such that said first upper run moves in a direction from the front toward the rear of the baler, f. a third roller mounted on said chassis adjacent to front thereof and spaced upwardly from said first roller, said third roller being mounted for rotation about a substantially horizontal, transverse axis, g. a fourth roller mounted on said chassis adjacent to the rear thereof and spaced upwardly from said second roller, said fourth roller being mounted for rotation about a substantially horizontal, transverse axis, h. a second conveyor belt extending transversely substantially between said first and second side walls and drivingly mounted on said third and fourth roller forming a second upper run extending between and above said third and fourth rollers and a second lower run between the lower surfaces of said third and fourth rollers, i. means for driving said second conveyor belt such that said second lower run moves in a direction from the rear toward the front of the baler, j. a bale-starter roller mounted on said chassis, adjacent to the rear thereof and positioned vertically between the second lower run and the first upper run, k. means for rotating said bale-starter roller in the same direction as said second and fourth rollers, l. pick-up means at the front of said chassis for picking up the windrowed material from the ground and delivering it to the first upper run, and m. means to relocate said fourth roller and bale-starter roller in order to enable the bale formed by the baler to be removed from the baler, whereby windrowed material delivered to the first conveyor belt is transported to the rear of the baler where it is caused to reverse direction by the bale-starter roller to form the core of a round bale.

23. A rotary baler for forming a round bale of windrowed material comprising:

a. a chassis supported above the ground by at least two spaced apart wheels mounted thereon, said chassis having spaced apart first and second side walls, b. a hitch attached to the front of said chassis adapted for attaching the baler to a vehicle, c. a first roller mounted on said chassis adjacent to the front and bottom thereof for rotation about a substantially horizontal transverse axis, d. a second roller mounted on said chassis adjacent to the rear and bottom thereof for rotation about a substantially horizontal transverse axis, and for translational movement toward and away from the front of said baler, e. a first conveyor belt extending transversely substantially between said first and second side walls and drivingly mounted on said first and second rollers forming a first upper run extending between and on the top of said first and second rollers and a first lower run between and below said first and second rollers, movement of said second roller toward the front of said baler permitting downward deflection of said first upper run, the extent of deflection being proportional to the weight of the bale being formed, f. means for driving said first conveyor belt such that said first upper run moves in a direction from the front toward the rear of the baler, g. a support arm pivotally mounted on said chassis, h. a third roller mounted on said chassis adjacent to the front of said chassis and spaced upwardly from said first roller, said third roller being mounted for rotation about a substantially horizontal, transverse axis, i. a fourth roller mounted on said support arm adjacent to the rear of said chassis and spaced upwardly from said second roller, said fourth roller being mounted for rotation about a substantially horizontal, transverse axis, j. a second conveyor belt extending transversely substantially between said first and second side walls and drivingly mounted on said third and fourth rollers forming a second upper run extending between and above said third and fourth rollers and a second lower run between the lower surfaces of said third and fourth rollers, k. means for drivng said second conveyor belt such that said second lower run moves in a direction from the rear toward the front of the baler, l. a tension member pivotally mounted on the chassis in forceable contact with the second conveyor belt, said tension member enabling increasing the length of said second lower run by upward deflection thereof ot accommodate the increasing diameter of a bale being formed by the baler, and means for controlling the force applied by said tension member on said second conveyor belt, m. a bale-starter roller rotatably mounted on said support arm adjacent to the rear of said chassis and positioned vertically between the second lower run and the first upper run, n. means for rotating said bale-starter roller in the same direction as said second and fourth rollers, o. selectively operable means to raise said support arm sufficiently to lift said fourth roller and bale-starter rollers above the intended height of said bale in order to enable the bale to be removed from the baler.

p. pick-up means at the front of said chassis for picking up the windrowed material from the ground and delivering it to the first upper run, whereby windrowed material delivered to the first conveyor belt is transported to the rear of the baler where it is caused to reverse direction by the bale-starter roller to form the core of a round bale.

24. A rotary baler as defined in claim 23 wherein the first conveyor belt includes a plurality of parallel transversely extending slats on the exterior surface thereof, said slats projecting transversely beyond the sides of said first conveyor belt, the length of said slats being substantially equal to the distance between said first and second side walls in order to prevent transverse shifting movement of said first conveyor belt relative to said first and second rollers.

25. A rotary baler as defined in claim 1 wherein said bale-starter roller is provided with a high friction surface on the outer surface thereof.

* * * * *

UNITED STATES PATENT OFFICE
CERTIFICATE OF CORRECTION

Patent No. 3,964,246          Dated June 22, 1976

Inventor(s) ARNOLD F. KOPASKA

It is certified that error appears in the above-identified patent and that said Letters Patent are hereby corrected as shown below:

Claim 1, (d), line 13, "aand" should read --and--.

(f), line 23, the word "and" should be --said--.

(m), line 51, the word "started" should be --starter--;

, after the word "bale" the words --formed by the baler-- should be added.

Claim 13, line 2, the word "sring" should be --spring--.

Claim 20, line 6, the word "ball" should be --bale--.

Claim 23, (k), line 49, the word "drivng" should be --driving--;

, line 56, the word "ot" should be --to--.

Signed and Sealed this

Thirtieth Day of November 1976

[SEAL]

Attest:

RUTH C. MASON
*Attesting Officer*

C. MARSHALL DANN
*Commissioner of Patents and Trademarks*